March 27, 1962 R. V. PATTERSON 3,027,200
TRACTOR TRACKS
Filed Nov. 16, 1959 3 Sheets-Sheet 1
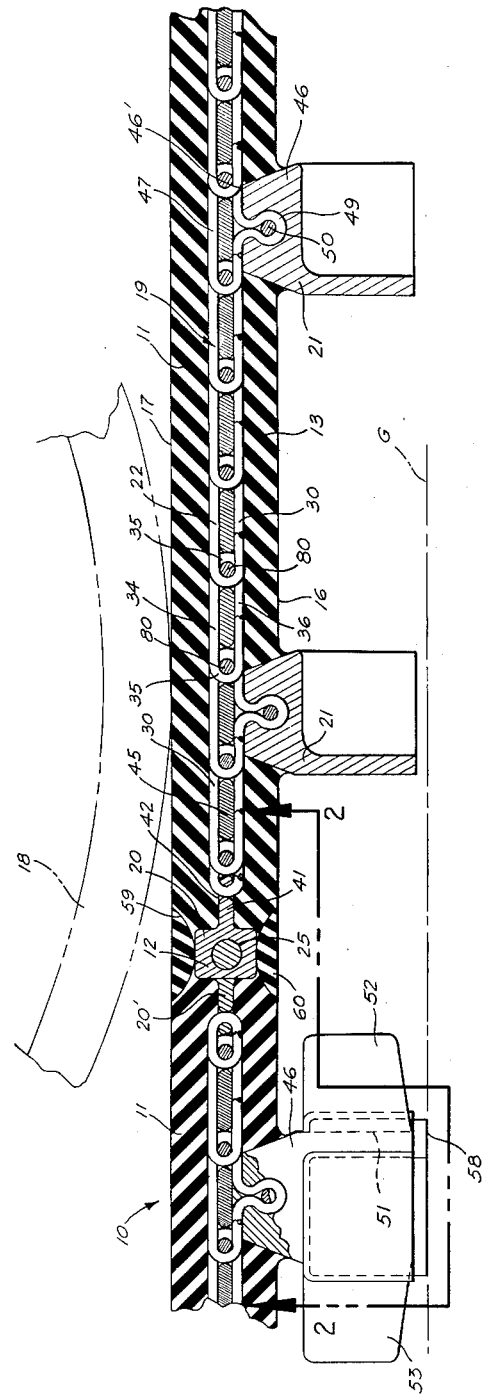
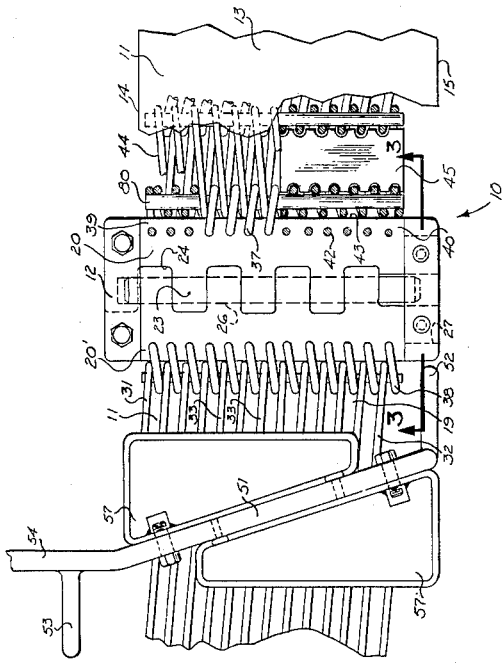
ROBERT V. PATTERSON
INVENTOR.
BY
ATTORNEY

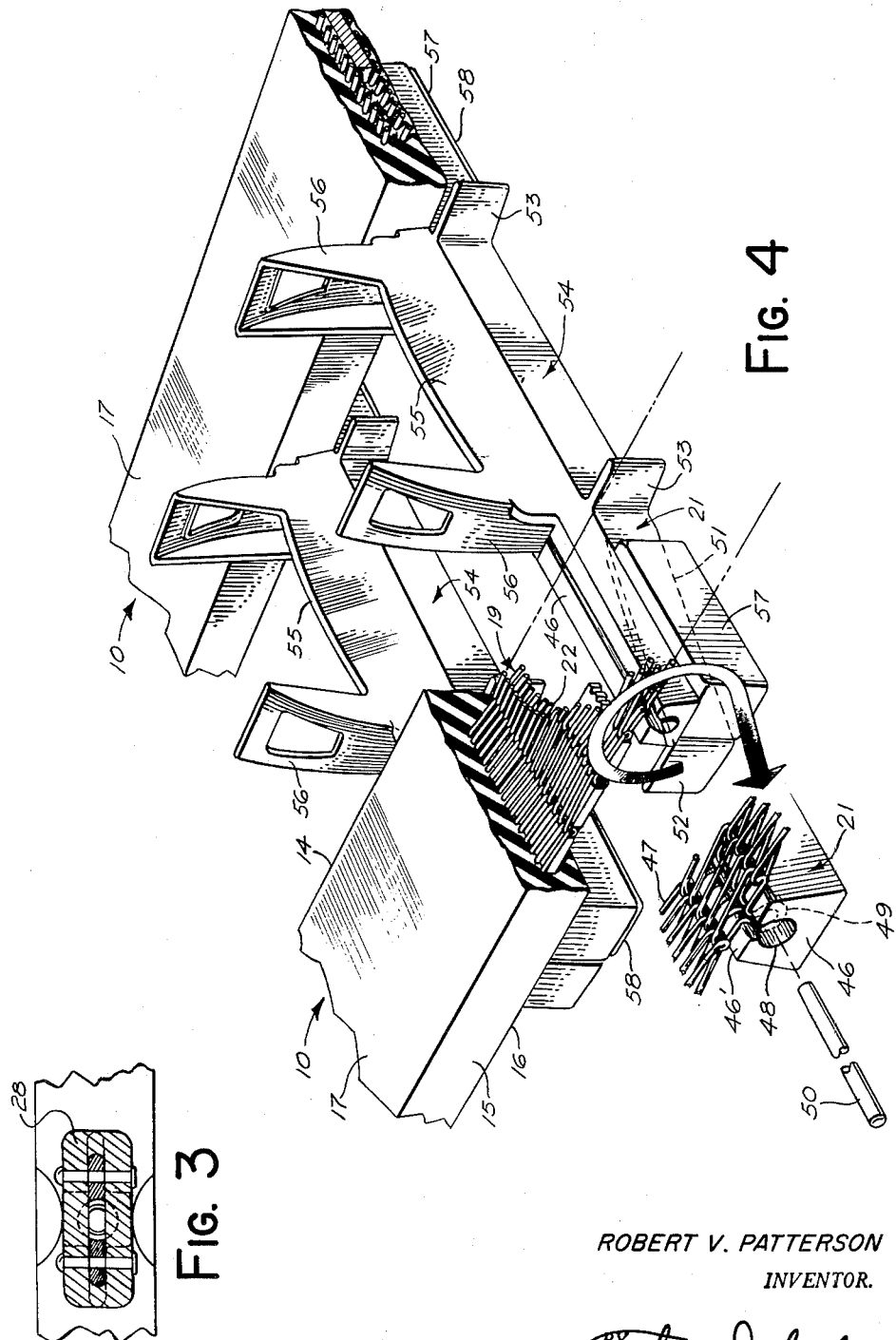

March 27, 1962   R. V. PATTERSON   3,027,200
TRACTOR TRACKS
Filed Nov. 16, 1959   3 Sheets-Sheet 3

ROBERT V. PATTERSON
INVENTOR.

BY Thomas J. Holden
ATTORNEY

United States Patent Office 3,027,200
Patented Mar. 27, 1962

3,027,200
TRACTOR TRACKS
Robert V. Patterson, Baltimore County, Md., assignor to Aircraft Armaments, Inc., Cockeysville, Md., a corporation of Maryland
Filed Nov. 16, 1959, Ser. No. 853,055
11 Claims. (Cl. 305—37)

This invention relates to tractor tracks and, more particularly, to tractor tracks of the type having metallic reinforcing in the form of a helical wire mesh belt.

Tractor tracks of the class described are usually made up of a plurality of units, each of which has ends adapted to abut and be attached to the ends of adjacent like units for forming an endless track. Transversely extending rigid connecting bars are positioned adjacent the ends of each track unit, and a plurality of helical wire links engaging the bars interconnect the latter and transmit track loads from one bar to the other. A body of rubber-like composition encases the links and bars so that the latter form a metallic reinforcing for the rubber body. By positioning the helical wire links so that their axes are parallel to the bars and the spirals of adjacent links are interleaved, pins inserted between interleaved spirals form hinged connections between adjacent links to facilitate bending of the track unit around idler and traction wheels of a track laying vehicle. All of the spirals of the terminal links of the wire mesh belt so formed are connected to their respective connecting bars, each link of the metallic reinforcing constituting a continuous load carrying member which extends across the entire width of the track unit from one of the bars to the other. In this manner, a concentrated load on any part of a given link is applied to the interconnecting pin and thus distributed throughout the entire link adjacent the given link. As a result, tracks of the class described easily resist concentrated loads which would sever cable or link-type tracks wherein the metallic reinforcing is in the form of a plurality of independent load carrying members, each of which extends continuously from bar to bar rather than from one end of a bar to the other as with a wire mesh track of the type described.

Because the metallic reinforcing is continuously across the width of the track in units of the class described, the track is much more resistant to torsional deflection in comparison to conventional cable or link-type track. Being more resistant to torsional deflection means that the track of the class described is less likely to run off the sprockets of a vehicle when the track is subjected to torsional stress. However, track units of the class described, while being superior to cable track in resisting concentrated and torsional loads, are as deficient as cable tracks in accepting compressive loads without excessive deflection. In tracks of the class described spacer plates may be inserted within the spirals of the interleaved links in order to prevent collapse of one link into an adjacent link. In such manner, the rolling resistance of a track laying vehicle, or the work required to bend the track around the idler and drive sprockets of a vehicle, is kept low while the ability to resist deflections caused by torsional and compressive loads is maintained without the addition of extra guides external to the rubber cover on the track.

In view of the above discussion, it should be apparent that tracks of the class described are relatively light in weight and require a relatively small amount of power for movement of the tracks over the sprockets of a vehicle. Thus, vehicles equipped with tracks of the class described are able to traverse paved roads at high speed with low fuel consumption and without causing damage to the roads, since the tracks have low mass and are rubber covered. However, when it is desirable to operate off paved roads, it is necessary to provide the rubber body of the tracks with some means to increase their tractive effort. Grouser bars, held spaced from a paved road by the rubber cover, are generally provided for this purpose. It is the connection of such grouser bars to the reinforced rubber track of the class described that has been a problem prior to this invention. Such connection should ideally be one which connects each spiral of a link to the grouser in such a manner that loads on the grouser are uniformly distributed over the entire link that is attached to the grouser. Welding is an elementary connection, but welds lack resistance to fatigue failure. Moreover, welding destroys the continuity of a link since each spiral becomes rigidly connected to the grouser; the welded spirals acting as a plurality of independent load bearing members spaced transversely of the track.

Much effort has been expended by those skilled in the art to devise a connection between the metallic reinforcing of tracks of the class described and grouser bars which does not suffer from the deficiencies described above, but so far as is known no successful connection has yet been contributed to the art, and the problems outlined above remain unsolved. It is, therefore, an object of this invention to provide a track of the class described to which grouser bars may quickly and conveniently be connected to provide for uniform distribution of concentrated loads.

As a feature of this invention whereby the objects thereof are achieved, a grouser bar is provided with apertures through which the spirals of a link are threaded. Since no spiral is rigidly attached to the grouser, each of the spirals of a link is connected to the grouser bar to thus constitute a continuous load carrying member which extends across the width of the track with the load on one spiral being transferred through the continuous link to the remaining spirals.

As another feature of this invention whereby the objects thereof are achieved, a grouser bar is provided with a dovetail slot, and a matching loop on the bottom portions of each of the reinforcing spirals is engaged in the slot. The loops may be either integral with the spirals or made up of a separate link interleaved with the reinforcing link. In either case, the grouser is easily attached to the metallic reinforcing before the rubber-like cover is bonded thereto, yet in both cases concentrated loads are distributed as described above since the spirals are not rigidly attached to the grouser.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

In the drawings:

FIGURE 1 is a longitudinal sectional view of a wire mesh track showing a preferred form of connection between a grouser and the mesh.

FIGURE 2 is a bottom view, partly in section, of the track shown in FIGURE 1 and showing the splice joint between track units.

FIGURE 3 is a side view of the splice joint.

FIGURE 4 is a perspective view, partly in section, showing the present invention incorporated into a track for a vehicle.

Figure 5:
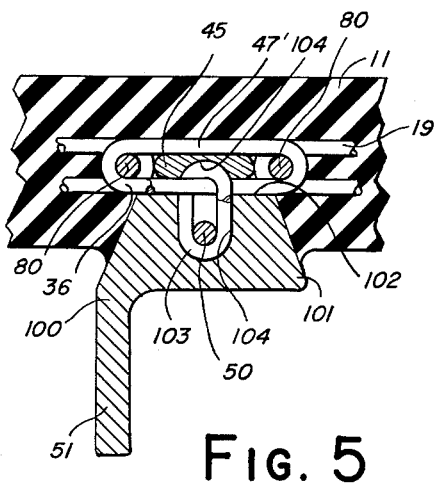
FIGURES 5, 6, 7 and 8 are modifications of the connection between grouser and mesh.

Reference is now made to FIGURE 2. Shown therein is a track 10 for a track laying vehicle. Track 10 is made up of a plurality of individual track units 11, each of which has ends adapted to abut and be attached to the ends of adjacent like units, as by splice 12, for forming endless track 10. Each track unit 11 is identical, so that the description of the construction of a single unit and its method of attachment to an adjacent unit is sufficient for an understanding of the invention. It should be understood that an endless track of any length can be formed by selecting a suitable number of track units.

Track unit 11 comprises a body 13 of rubber-like composition having longitudinally extending side edges 14 and 15 which define the width of tread 16. Top 17 of body 13 is the surface which is engageable with road wheels 18 on a track laying vehicle. Contained within body 13 is metallic reinforcing 19 in the form of transversely extending rigid connector bars 20 and 20′ at the abutting ends of the track unit, transversely extending rigid grouser bars 21 intermediate the abutting ends, and a wire mesh belt 22 interconnecting the bars. Reinforcing 19 serves to transmit track loads from one bar to another and thus take tensile loads off the rubber cover.

The exact construction of splice 12 is not a factor in this invention, and any type of splice can be used. In the disclosed embodiment of the invention, splice 12 is formed by abutting connector bar 20 of one track unit with connector bar 20′ on an adjacent unit, it being understood, of course, that each unit has bars 20 and 20′ at the ends thereof. Connector bar 20 has tangs 23 and notches 24 which are engaged with corresponding tangs and notches on connector bar 20′. Aperture 25 extends through the tangs in both bars so that splice pin 26 engaged in the aperture prevents separation of the abutting track units. Splice pin 26 has flattened end portions engaged in a matching aperture in bar 20 so that the pin cannot rotate with respect thereto. It is essential that bars 20 and 20′ be prevented from moving relative to each other in order to prevent abrasives from causing wear as a result of such moving. Accordingly, the terminal ends 27 of both bars are reduced and clamps 28 bolted or riveted thereto such that a non-rotatable splice joint is formed.

Wire mesh 22 includes a plurality of flattened helical springs 30. As seen in FIGURE 2, each spring has end spirals 31 and 32 and a plurality of intermediate spirals 33 between the end spirals. Referring now to FIGURE 1, each spiral has a top portion 34 interconnected by U-shaped end portions 35 to bottom portion 36 which is substantially parallel to top portion 34. Springs 30 are arranged side by side with the U-shaped end portions 35 on the spirals of one spring being interleaved with the U-shaped end portions 35 of an adjacent spring. Connector pin 80 is inserted between interleaved springs for hingedly connecting the same whereby a wire mesh is formed.

In order to maintain a uniform belt width, springs 30 are best arranged with alternating left hand and right hand springs. In addition, the spacing between spirals of the springs is made substantially the same as the diameter of the wire out of which the springs are formed. In this manner, the spirals of adjacent interleaved springs are in solid contact across the width of the track. As a result of this construction, the wire mesh belt is better able to resist deflection due to side loads.

The wire mesh belt formed as described above has one terminal spring 37 at one end of the track unit and a second terminal spring 38 at the other of the track unit, with the remaining springs being intermediate and hingedly connected to each other and to the terminal springs through connector pins 80. As shown in FIGURE 2, connector bars 20 and 20′ lie transverse to longitudinally extending edges 14 and 15. End portions 39 and 40 of connector bar 20 are substantially adjacent edges 14 and 15, respectively. It should be noted that the length of pins 80 and the height of springs 30 are substantially the same as the width of the body 11 as defined by edges 14 and 15. However, the wire reinforcing shown is deliberately made smaller than the over-all width of the rubber cover to insure that the wire mesh will be completely enclosed, and to provide as large a surface as possible for road wheels 18 to bear upon. The effective width of the track section is nevertheless the space between end spirals 31 and 32 of springs 30, since the track loads able to be carried by the rubber cover are negligible with respect to the loads carried by reinforcing 19. Thus, the term "substantially adjacent" when applied to end portions 39 and 40 of bars 20 and end spirals 31 and 32 of springs 30 means that the parts in question need only be close to edges 14 and 15.

Connector bar 20 has a web portion 41 provided with a plurality of apertures 42 spaced transversely across the length of the bar between end portions 39 and 40. The spirals of terminal spring 37 are threaded in apertures 42 so that the axis of spring 37 is parallel to bar 20, and the end spirals of spring 37 are substantially adjacent end portions 39 and 40. In a like manner, terminal spring 38 is attached to bar 20′. Apertures 42 are spaced from the transverse edge 43 a sufficient distance so that the U-shaped end portions of the intermediate spring 44 that is interleaved with spring 37 may contact edge 43. As best shown in FIGURE 2, edge 43 prevents relative longitudinal movement between intermediate spring 44 and web portion 41 while spring 37 and pin 80 permits rotation of spring 44 about pin 80. In addition, there is limited rotation of spring 37 in apertures 42. The above described rotation of the springs about axes transverse to the track is the factor which significantly reduces the work required to move the track around the wheels of a track laying vehicle. It should be noted in this regard, that the facilitation of bending of the track about axes transverse to the track has been accomplished without sacrificing resistance to lateral deflection of the track due to side loads.

Spacer plates 45 are inserted within the parallel top and bottom portions 34 and 36 of intermediate springs 44. The purpose of these plates is to prevent one intermediate spring from collapsing into an adjacent intermediate spring when a compressive stress is applied to the track. Such stress can arise when side loads are applied to edges 14 and 15. Consider, for example, that a side load is applied to the track shown in FIGURE 2 upon edge 15 and directed toward edge 14. Such load could arise from braking one track and powering the other track on a vehicle and would come about upon executing a turn. The side load would cause the spirals of the springs adjacent end spiral 31 to be under tensile load while the spirals of the springs adjacent end spiral 32 would be under a compressive load. Without spacer 45, the portion of the springs under compressive load would tend to collapse. Accordingly, plate 45 in a spring is of a width sufficient to contact the U-shaped portions 35 of the adjacent springs that are interleaved and pinned to the first spring. Optimum resistance to side loads is obtained by causing spacer plate 45 to contact pins 80 and is accomplished by notching the plate on each lengthwise edge for U-shaped end portions 35 of the spirals. These notches prevent transverse movement of space plate 45 with respect to the springs. The length of spacer 45 with respect to width of tread 16 is shown to be about a half. The reason for this will be more apparent later, but the spacer could be as long as pins 80 if weight of track is not considered.

The above discussion is related to a band-type track ideally suited for paved roads. Such track can resist tensile, compressive and torsional loads without excessive deflection because the primary load carrying reinforcing member is a single piece of helical wire which extends transverse to the track from one edge thereof to the other. In order to make this track more suitable for rough terrain, grouser bars 21 are attached to the reinforcing 19. Referring now to FIGURE 1, bar 21 has an enlarged portion 46 having a top flat portion 46' which seats against the bottom flat portions 36 of the spirals of connector spring 47. Each spiral is attached to portion 46 of bar 21. This is accomplished by providing a groove 48 in enlarged portion 46. This groove extends from one end portion of bar 21 to the other. Groove 48 opens into top 46', and in the embodiment shown in FIGURES 1–3, the width of the groove remote from top 46' is greater than the width of the groove at top 46'. As seen in FIGURE 1, for example, groove 48 is "dovetail" in cross-section. Connector spring 47 is fashioned so that the bottom portions of each spiral thereof have a loop 49 projecting downwardly. Loop 49 has a width remote from the straight bottom portion of a spiral that exceeds the width closely adjacent the straight bottom portion. The dimensions of groove 48 and loops 49 are such that they closely interlock or dovetail, assembly being accomplished by moving the reinforcing 19 transverse to bar 21. With this construction, each spiral of connector spring 47 is attached to bar 21 in a continuous manner which is distinctively different from a rigid welding of each spiral. To prevent the sliding of loops 49 in groove 48, loop pin 50 is forced inside of loops 49 to spread the same into tight frictional engagement with the groove. In this condition, top 46 is held in tight engagement with the straight bottom portions of each spiral of spring 47. As a result of this construction, bars 21 are securely attached to reinforcing 19. Twisting of bar 21 with respect to reinforcing 19, such as occurs when flange 51 of bar 20 grips rough terrain to provide traction, is directly imparted to connector spring 47 because of the above described connection between the bar and spring. As a result, such twisting generates tensile loads in the remainder of the reinforcing, these being the loads most efficiently resisted by the springs. At the same time, bar 21 does not exert a shear stress directly upon the spirals as would be the case were the spirals welded.

In applying the invention to a given vehicle, enlarged portion 46 of bar 21 is provided with stabilizer tab 52 on one end of flange 51 and stabilizer tab 53 on the other end of flange 51 as shown best in FIGURE 4. Flange 51 is inclined with respect to the path of the track with the stabilizer pads being oppositely directed. This construction prevents rocking of flanges 51 and makes grouser bars 21 self-cleaning. To provide for positive action of the driving sprocket of a vehicle on the track, a double belt is used as shown in FIGURE 4, and grouser 54 has grouser bars 21 at each end with sprocket rider 55 adapted to be engaged by the driving sprocket of the vehicle. The pitch between flanges 55 is, of course, the pitch of the sprocket. Attached to rider 55 and adjacent each track 10 are center guide flanges 56. Each road wheel 18 has a divided face which rides on surface 17 of each track, with center guides 56 riding between the faces for guidance thereby. Such construction insures that the track does not run off the driving sprocket.

While flanges 51 provide the necessary traction for rough terrain, they would gouge improved roads. To permit operation over improved roads, road pads 57 are bolted or otherwise fastened to flanges 51. These road pads have rubber treads 58 which are of such height that the extremities of flange 51 are held spaced from the ground line G. This construction is desirable in order to facilitate fabrication of the track.

To assemble a track unit, grousers 54 are first positioned as shown in FIGURE 4. Reinforcing 19 having connector bars 20 and 20' at opposite ends may then be attached to each side of the grousers by moving the reinforcing transversely with respect to bars 21 so that loops 49 are inserted in grooves 48. Pins 50 may then be introduced to securely attach the reinforcing to the grousers. The number of grousers, the spacing therebetween, and the number of helical wire links between grousers may be adjusted to provide whatever pitch, track unit length, and strength that is desired. The resulting metallic skeleton constructed as described above may be placed in a mold and rubber cover 13 molded therearound in a conventional manner. The rubber cover adjacent connector bars 20 and 20' is feathered as at 59 into the bars at about the centerline of aperture 25. To assemble the track units to form an endless track, the connector bars of adjacent units are engaged so that aperture 25 is defined. After pin 26 is inserted in aperture 25, clamp 28 is attached to form, thereby the non-rotatable splice 12. To seal the splice against foreign matter, air or heat curing synthetic rubber 60 may be inserted in the shallow groove defined by feathered edge 59. Road pads 57 may then be attached to flange 51.

The reason for having spacer plates 45 extend only halfway between edges 14 and 15 can best be understood by reference to FIGURE 4. The application of side loads to a track having two tread sections means that only the outermost edges of both track sections will be subjected to large scale compressive stresses. As a result, spacer plates 45 are inserted halfway into the wire links adjacent the outermost edges thereof. In this manner, a significant weight saving is achieved without effecting much change in resistance to side loads.

A modification of the manner in which a grouser can be attached to the reinforcing is shown in FIGURE 5. Reference numeral 100 designates a modified grouser bar having a flange 51 and an enlarged portion 101 having a flat top portion 102 which seats against the bottom flat portions 36 of connector spring 47'. However, instead of making loops 49 integral with the spring, flattened spring 103 is intertwined with the bottoms of each spiral. Uniform groove 104 in portion 101 of the grouser bar is shaped to receive spring 103. Pin 50 securely connects spring 103 to the grouser bar. Spacer plate 45' has a circular recess 104 which engages spring 103 and helps to secure it to connector spring 47'.

Figure 6:
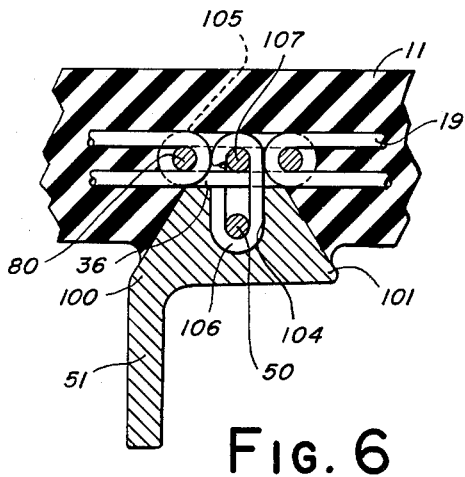

Another embodiment is shown in FIGURE 6. Grouser bar 100 has an enlarged portion 101 with a flat top portion seated against the bottom flat portions 36 of connector spring 105. Loop spring 106 is interleaved with the spirals of connector spring 105, and pin 107 is used to attach spring 106 to spring 105. The pitch of spring 105 is such that the spirals of spring 106 fill the space between the adjacent springs that are interleaved with spring 105. The enlarged portion 101 has a uniform recess 104 therein for receiving spring 106 which is held therein by pin 50 in the manner previously described. It should be evident that spring 106 extends transversely across the track for the width thereof.

Figure 7:
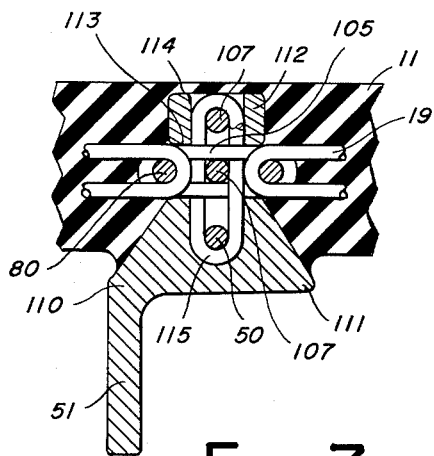

Still another embodiment is shown in FIGURE 7. Grouser bar 110 has an enlarged portion 111 which is tapered to form a head 112. A transverse slot 113 in head 112 is provided of a dimension large enough to receive the flattened springs which make up the reinforcing. Groove 114 opens into the top of head 112 and extends below and normal to slot 113. Elongated spring 115 is interleaved with connector spring 105 and fits within groove 114. Pins 107 and 50 are utilized to securely retain the grouser bar, elongated spring and connector spring together.

Figure 8:
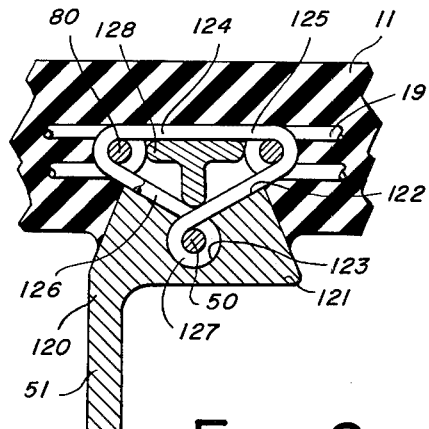

In the embodiment of FIGURE 8, grouser bar 120 has an enlarged portion 121 having a transversely extending wedge-shaped depression 122 in the top surface. A dovetail groove 123, which opens into the apex of depression 122 likewise extends transverse to track 11. Connector spring 124 is generally triangular in shape with the top leg 125 being generally parallel to the top portions of the reinforcing springs and the other two side legs 126 contacting the surface of depression 122. Spring 124 has at its lower apex, a loop 127 which fits within dovetail groove 123. Spacer 128 is T-shaped with upper arms abutting the U-shaped end portions of the reinforcing springs that are interleaved with spring 124. The lower arm of spacer 128 abuts the apex of legs 126 to securely maintain the shape of spring 124. In a manner similar to the embodiment of FIGURE 1, pin 50 spreads loop 127 into tight frictional engagement with walls 123 so that with the above described construction, grouser 120 is securely attached to the reinforcing.

With the above described invention, grousers can be attached to each spiral of a helical element that extends transversely across the width of a track in such manner that the element as a whole operates as a single, continuous load carrying member. Those skilled in the art will now appreciate that the use of this information will effectively distribute concentrated loads that are applied to the grouser to an entire helical spring.

What is claimed is:

1. A track for a track laying vehicle comprising a body of rubber-like composition having longitudinally extending edges defining a tread of given width, and metallic reinforcing contained within said body, said reinforcing including a first rigid bar having end portions, said first bar being transverse to said body with said end portions being substantially adjacent said edges, said first bar having a plurality of transversely spaced apertures therein, a first wire helix having end spirals and a plurality of intermediate spirals, said spirals being engaged in said apertures so that the axis of said first helix is parallel to said first rigid bar and said end spirals are substantially adjacent said end portions, a second rigid bar having end portions, said second bar being parallel to said first bar with the end portions of said second bar being substantially adjacent said edges, and means connecting the spirals of said first helix to said second bar.

2. The track of claim 1 wherein said last named means comprise a second wire helix having end spirals and a plurality of intermediate spirals and means connecting the spirals of said second helix to said second bar so that the axis of said second helix is parallel to said second bar and the end spirals of the second helix are substantially adjacent the end portions of the second bar.

3. A track for a track laying vehicle comprising a body of rubber-like composition having longitudinally extending edges defining a tread of given width, and metallic reinforcing contained within said body, said reinforcing including a plurality of flattened helical springs, each of said springs having end spirals and a plurality of intermediate spirals, each spiral having top and bottom portions interconnected by U-shaped end portions, said springs being side-by-side with the U-shaped end portions of one spring being interleaved with the U-shaped end portions of an adjacent spring, a pin inserted between interleaved springs for hingedly connecting the same whereby a wire mesh is formed having terminal springs hingedly connected to intermediate springs, the end spirals of said springs being substantially adjacent said edges, a first rigid bar having end portions substantially adjacent said edges, first connector means connecting one terminal spring to said first bar, a second rigid bar parallel to said first bar and having end portions substantially adjacent said edges, said second bar having a groove therein extending substantially from one end portion to the other, a loop attached to the bottom portions of the spirals on the other terminal spring and engaged in said groove, and retaining means engaged with the loops and second bar for retaining the loops in the groove.

4. The track of claim 3 with said loops being integral with the bottom portions of the spirals.

5. The track of claim 3 with said loops being the spirals of a separate helical spring, and said latter spirals being interleaved with the bottom portions of the spirals of said other terminal spring for attaching said separate spring to said other terminal spring.

6. The track of claim 3 with said loops being the spirals of a separate helical spring, said latter spirals being interleaved with the bottom portions of the spirals of said other terminal spring, and a pin inserted between the latter interleaved spirals for attaching said separate spring to said other terminal spring.

7. A track for a track laying vehicle comprising a body of rubber-like composition having longitudinally extending edges defining a tread of given width, and metallic reinforcing contained within said body, said reinforcing including a plurality of flattened helical springs, each of said springs having end spirals and a plurality of intermediate spirals, each spiral having top and bottom portions interconnected by U-shaped end portions, said springs being side-by-side with the U-shaped end portion of one spring being interleaved with the U-shaped end portions of an adjacent spring, a pin inserted between interleaved springs for hingedly connecting the same whereby a wire mesh is formed, the end spirals of said springs being substantially adjacent said edges, a grouser bar having end portions substantially adjacent said edges, said grouser bar having a flange extending beyond said body, a road pad attached to said flange, and connector means for attaching said grouser bar to one of said springs.

8. The track of claim 7 with the top and bottom portions of said one spring being substantially parallel, said grouser having a top surface engaged with the bottom portions of said one spring, said grouser bar having a groove therein extending substantially from one end portion to the other, said groove opening in said top surface, loops attached to the bottom portions of said one spring and extending into said groove, and means for retaining said loops in said groove.

9. The track of claim 8 with said loops being integral with the bottom portions of said one spring.

10. The track of claim 8 with said loops being spirals of a separate helical spring, said latter spirals being interleaved with the bottom portions of the spirals of said one spring for attaching said separate spring to said one spring.

11. A track unit having ends adapted to abut the ends of adjacent like units for forming an endless track comprising: transversely extending rigid bars positioned adjacent the ends of said track unit, a plurality of links engaging said bars for connecting the bars together, each of said links being a continuous load carrying member which extends the length of said bars transverse to the track unit, and a body of rubber-like composition encasing said links and bars.

References Cited in the file of this patent

UNITED STATES PATENTS

| | | |
|---|---|---|
| 432,804 | Midgley | July 22, 1890 |
| 2,244,422 | Guba | June 3, 1941 |
| 2,338,550 | Sloman et al. | Jan. 4, 1944 |
| 2,575,813 | Hutchins | Nov. 20, 1951 |
| 2,592,916 | Leguillon | Apr. 15, 1952 |
| 2,796,302 | Atkinson | June 18, 1957 |
| 2,881,904 | Hoerth | Apr. 14, 1959 |
| 2,912,098 | Manes et al. | Nov. 10, 1959 |